D. M. HARTSOUGH.
GANG PLOW.
APPLICATION FILED JAN. 11, 1912.
1,215,654.
Patented Feb. 13, 1917.
2 SHEETS—SHEET 1.
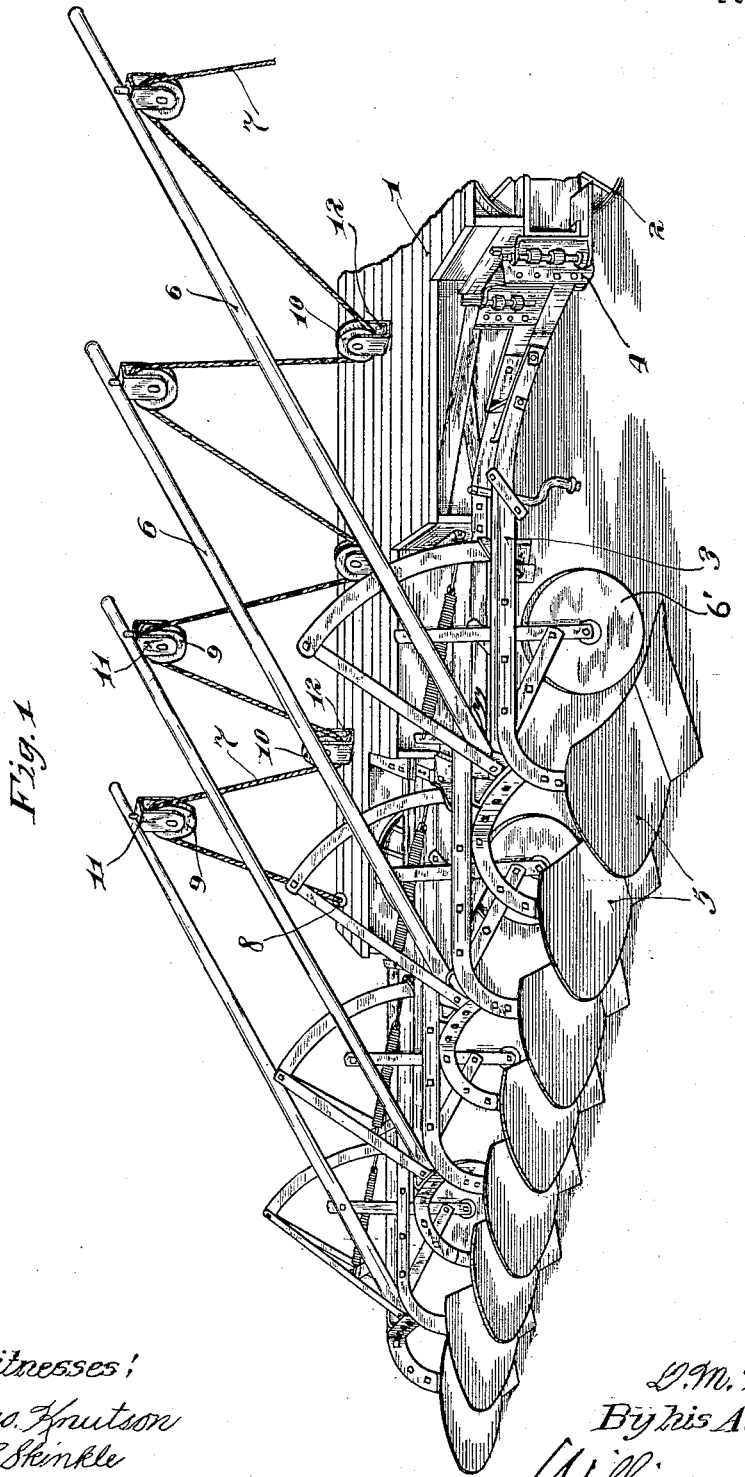
Witnesses:
Geo. Knutson
E. C. Skinkle
Inventor:
D. M. Hartsough
By his Attorneys
Williamson Merchant D. M. HARTSOUGH.
GANG PLOW.
APPLICATION FILED JAN. 11, 1912.
1,215,654.
Patented Feb. 13, 1917.
2 SHEETS—SHEET 2.
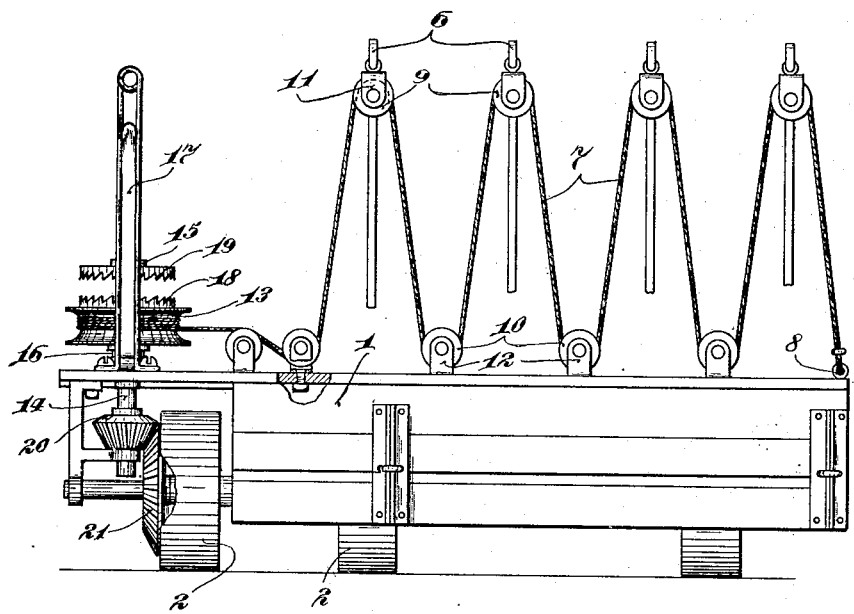
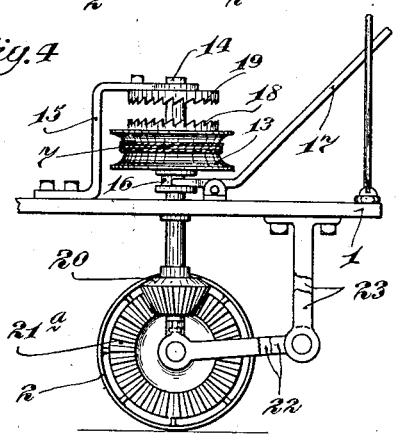
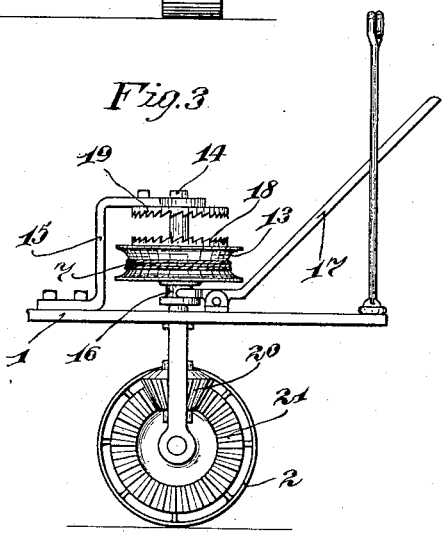
Witnesses:
Geo. Knutson
E. C. Skinkle
Inventor:
D. M. Hartsough,
By his Attorneys,
Williamson Merchant

UNITED STATES PATENT OFFICE.

D. MAURICE HARTSOUGH, OF MINNEAPOLIS, MINNESOTA, ASSIGNOR TO DEERE AND COMPANY, OF MOLINE, ILLINOIS, A CORPORATION OF ILLINOIS.

GANG-PLOW.

1,215,654.      Specification of Letters Patent.      Patented Feb. 13, 1917.

Application filed January 11, 1912. Serial No. 670,555.

*To all whom it may concern:*

Be it known that I, D. MAURICE HARTSOUGH, a citizen of the United States, residing at Minneapolis, in the county of Hennepin and State of Minnesota, have invented certain new and useful Improvements in Gang-Plows; and I do hereby declare the following to be a full, clear, and exact description of the invention, such as will enable others skilled in the art to which it appertains to make and use the same.

My invention has for its object to provide an extremely simple and highly efficient device for raising in succession and for lowering in succession, the plow beams of gang plows; and to such ends, generally stated, the invention consists of the novel devices and combinations of devices hereinafter described and defined in the claims.

As is well known, in the present commercial gang plows which are drawn by a traction engine, or otherwise driven by tractive power from an engine, it is customary to provide the plow beams with long levers by means of which the plows may be independently raised and lowered, either as single members or as plows connected in pairs to the several beams.

My invention provides a novel form of cable attachment operating as a connection between the plow beams and relatively fixed part of a plow truck, and preferably a single cable, anchored at one end to the plow truck frame, is attached at its other end to a windlass drum and is passed over guide sheaves, alternately attached to the plow beam levers and to the plow truck platform. The windlass cable may be driven by a traction wheel, or by other suitable means, but certain advantages such as a properly regulated successive raising and lowering of the plows in respect to the distance traveled, is best accomplished by the use of a traction wheel. This traction wheel may be one of the carrying wheels of the truck or it may be an independent traction wheel provided solely for the purpose of lifting the plows.

Referring to the drawings wherein like characters indicate like parts throughout the several views, Figure 1 is a perspective view illustrating my improved plow lifting device applied to a gang plow of ordinary commercial form;

Fig. 2 is a front elevation of the gang plow shown in Fig. 1, some parts being broken away, and some parts being removed;

Fig. 3 is a detail in side elevation showing one of the plow truck wheels used as a traction wheel to drive the cable of the plow lifting device; and Fig. 4 is a view corresponding to Fig. 3, but illustrating a modified form wherein an independent vertically movable traction wheel is employed to operate the windlass.

Of the parts of the gang plow, the numeral 1 indicates a truck platform and draft frame; the numeral 2, one of the truck wheels; the numeral 3, the plow beams independently pivoted at their front ends to coupling brackets 4 on the plow frame 1; the numeral 5 the plows carried by the beams 3; the numeral 6 the plow lifting levers connected to the respective beams 3; and the numeral 6' indicates the ground-engaging supporting wheels connected to the levers and serving to support and to elevate the plows. All of the parts just noted are, or may be assumed to be, of standard well known construction, and the plows are arranged in the usual manner in an oblique line with respect to the direction of travel of the truck.

In the simplest application of my improved plow lifting device, a single lifting cable 7 is anchored at one end at 8 to the plow frame 1, and is passed alternately over guide sheaves 9 and 10, journaled in brackets 11 and 12, respectively connected to the free ends of the lifting levers 6 and to the truck frame 1. The other end of this lifting cable 7 (see Figs. 2 and 3) is attached to and adapted to be wound upon a windlass drum 13 which is secured to a vertically movable upright shaft 14, mounted to rotate in a portion of the truck frame 1 and in a bracket 15 secured on the latter. The drum 13 has a grooved hub 16 engaged by a lever 17, pivoted on the frame 1 and serving to raise and lower the said drum and the shaft 14 to which it is secured. On its upper face, the drum 13 is provided with ratchet teeth 18 that are adapted to be engaged with a ratchet-faced disk 19 secured on the bracket 15. On the lower end of the shaft 14 is a beveled pinion 20 that is adapted to be engaged and disengaged, at will, with a beveled gear 21 secured to the truck wheel 2.

As is evident, when the shaft 14 and drum 13 are lowered, the latter will be disengaged from the ratchet disk 19 and the pinion 20 will be engaged with the gear 21, so that the drum will then be driven when the plow truck is drawn forward. When the said drum is thus driven, the plows secured to the several plow beams will be raised from the ground in succession, and in a transverse order, counted from the most forward plow toward the most rearward plow. The relative arrangement of the traction wheel and coöperating parts of the plow lifting device should preferably be so arranged that under advance movement of the truck, the plows will be lifted in succession, in the order stated, and all will be raised from the ground approximately on a line at right angle to the direction of the truck's travel.

The above noted successive lifting of the plows is due to the fact that there is an increasing resistance at each successive loop or bend of the lifting cable and to friction in the sheave journals. Hence, with the arrangement illustrated in the drawing, the plows will be lifted successively and in order from the right toward the left in respect to Fig. 1, and they will be let down or lowered in the same order of succession, to-wit, in an order from right toward the left.

When the plows are all raised, they may be held in operative positions by engaging the ratchet teeth 18 of the drum 13 with the teeth of the fixed ratchet 19. When the drum is in an intermediate position, its ratchet teeth will be free from the teeth of the ratchet disk 19, and the pinion 20 will be free from the gear 21, so that the plows will be dropped.

The construction illustrated in Fig. 4 is like that illustrated in Fig. 3 with the exception that the gear 21ª and traction wheel 2ª are arranged to be raised and lowered with the shaft 14, pinion 20 and drum 13. In this arrangement, the lower end of the shaft 14 is swiveled to a bearing on one end of a link 22, which at its front end, is pivoted to a depending bearing 23 of the truck frame 1.

It will be observed that the supporting and lifting wheels 6' are so arranged that they are not required to take the stresses incident to constant forced engagement with the ground during the normal plowing operations. During normal plowing work the drum 13 can be left in its intermediate position, the rope 7 then being slack and free vertical movement of the supporting wheels and of the plows being possible. The wheels are, however, immediately available for lifting the plows whenever the rope is tensioned.

The mechanism which I have interposed between the traction motor wheel 2 and the ground-engaging plow-supporting and lifting wheels is so constructed that it serves to differentially transmit the power of the motor wheel to all of the supporting and lifting wheels. The power is transmitted and applied in such a way that each support receives a definite proportion of the force exerted by the motor, this proportion depending, in the form illustrated, upon the amount of friction in the several sheaves over which the rope passes. Lifting force is applied to all of the supports simultaneously but they are caused to move in succession because of the successively decreasing rope tension resulting from the resistance offered at the successive sheaves.

What I claim is:

1. In a plowing mechanism, the combination of a draft frame, a series of plowing units pivoted to the draft frame independently of each other and each comprising a relatively vertically movable ground-engaging support, a power device, and means connected with the power device for differentially applying the force thereof to all of the supports to move them downward and thereby lift the plowing units, the speed ratios between the power device and all of the supports being equal.

2. In a plowing mechanism, the combination of a draft frame, a series of plowing units pivoted to the draft frame and each comprising a relatively vertically movable ground-engaging support by means of which the unit can be lifted, a power device, and a power transmitting means connected with the power device and having uniformly speeded connections with the several supports whereby each serves as an abutment for the transmission of power to the others.

3. In a plowing mechanism, the combination of a draft frame, a series of plowing units flexibly connected to the draft frame independently of each other and means for lifting the several units in succession at uniform intervals comprising a single rope having connections with all of them, the rope tension decreasing successively between the successive connections.

4. The combination with a truck, of plows having beams pivotally connected to said truck, plow lifting levers secured to and projecting forward from said plow beams, cable guiding sheaves applied, in alternated arrangement, to said levers and to said truck, a single cable anchored to said truck at one end and passed directly and alternately over the guide sheaves on said levers and under the guide sheaves on said truck, and means applied to the other end of said cable, for lifting and lowering the plows.

5. The combination with a truck, of plows having beams independently pivoted to said truck at their front ends, of lifting levers secured to said plow beams and projecting forward over said truck, alternated cable guides on said lifting levers and on said truck, a cable anchored to said truck and passed directly and alternately through the cable guides on said levers and truck, and a power device applied to the other end of said cable for lifting and lowering said plows.

6. In a plowing mechanism, the combination of a draft frame, a series of plowing units flexibly connected to the draft frame independently of each other, and means for lifting the several units in succession at uniform intervals comprising a rotatable ground-engaging wheel, a winding drum interposed between said draft frame and the ground operatively connected with the wheel and mounted on said draft frame and a single rope engaging the drum and having connection with all of the plows to lift them at a rate definitely related to the rate of rotation of the said ground wheel.

7. The combination with a truck, of plows having beams pivotally connected to said truck for independent movements, lifting levers applied to said plow beams, alternated cable guides on said levers and on said truck, a single cable anchored at one end of said truck, and a power device carried by said truck and operative on the other end of said cable to wind up and release the same, the intermediate portion of said cable being passed alternately and directly through the guides on said lifting levers and truck on a zigzag course that progresses in a constant direction.

8. The combination with a truck, of a plurality of plows connected thereto for vertical movements to and from operative positions, of a plow lifting device comprising guides on said truck and on the several plow connections, a cable anchored at one end and passed alternately and directly through the guides on said truck and plow connections, said cable following a zigzag course that constantly progresses in a common general direction, and a power device applied to the other end of said cable for raising and lowering said plows.

In testimony whereof I affix my signature in presence of two witnesses.

D. MAURICE HARTSOUGH.

Witnesses:
BERNICE G. WHEELER,
F. D. MERCHANT.

Copies of this patent may be obtained for five cents each, by addressing the "Commissioner of Patents, Washington, D. C."